United States Patent [19]

Baier

[11] Patent Number: 5,339,627
[45] Date of Patent: * Aug. 23, 1994

[54] METHOD AND APPARATUS FOR REGULATING AND TESTING

[75] Inventor: Gunar Baier, Mannheim, Fed. Rep. of Germany

[73] Assignee: ABB Patent GmbH, Mannheim, Fed. Rep. of Germany

[*] Notice: The portion of the term of this patent subsequent to Nov. 9, 2010 has been disclaimed.

[21] Appl. No.: 938,893

[22] Filed: Aug. 31, 1992

[30] Foreign Application Priority Data

Aug. 31, 1991 [DE] Fed. Rep. of Germany ....... 4128997

[51] Int. Cl.$^5$ .............................................. F01N 3/20
[52] U.S. Cl. ....................................... 60/274; 123/691; 60/276; 60/277; 60/285
[58] Field of Search ............... 123/691; 60/274, 276, 60/277, 285

[56] References Cited

U.S. PATENT DOCUMENTS

| | | | |
|---|---|---|---|
| 4,079,714 | 3/1978 | Saito | 123/699 |
| 4,622,809 | 11/1986 | Abthoff et al. | 60/274 |
| 4,870,938 | 10/1989 | Nakaniwa | 123/674 |
| 5,090,199 | 2/1992 | Ikuta et al. | 60/277 |
| 5,133,184 | 7/1992 | Geiger | 60/277 |
| 5,159,810 | 11/1992 | Grutter et al. | 60/277 |
| 5,191,762 | 3/1993 | Kuroda et al. | 60/276 |

*Primary Examiner*—E. Rollins Cross
*Assistant Examiner*—Weilun Lo

[57] ABSTRACT

A method for regulating an Otto engine and for checking a catalyst connected downstream of the engine includes measuring at least a quantity of one component of an exhaust gas leaving an Otto engine before the exhaust gas enters a catalyst connected downstream of the engine, and measuring a quantity of at least two components of the exhaust gas after the exhaust gas leaves the catalyst. An apparatus for regulating the engine unit and checking the catalyst includes a lambda sensor disposed in the exhaust line between the engine unit and the catalyst. A first line is connected to the lambda sensor. A diagnosis and engine control unit is connected to the first line for receiving output signals of the lambda sensor. A sensor unit is downstream of the output of the catalyst. A second line delivers output signals of the sensor unit to the diagnosis and engine control unit. A third line delivers output signals of the diagnosis and engine control unit to the engine unit.

9 Claims, 1 Drawing Sheet

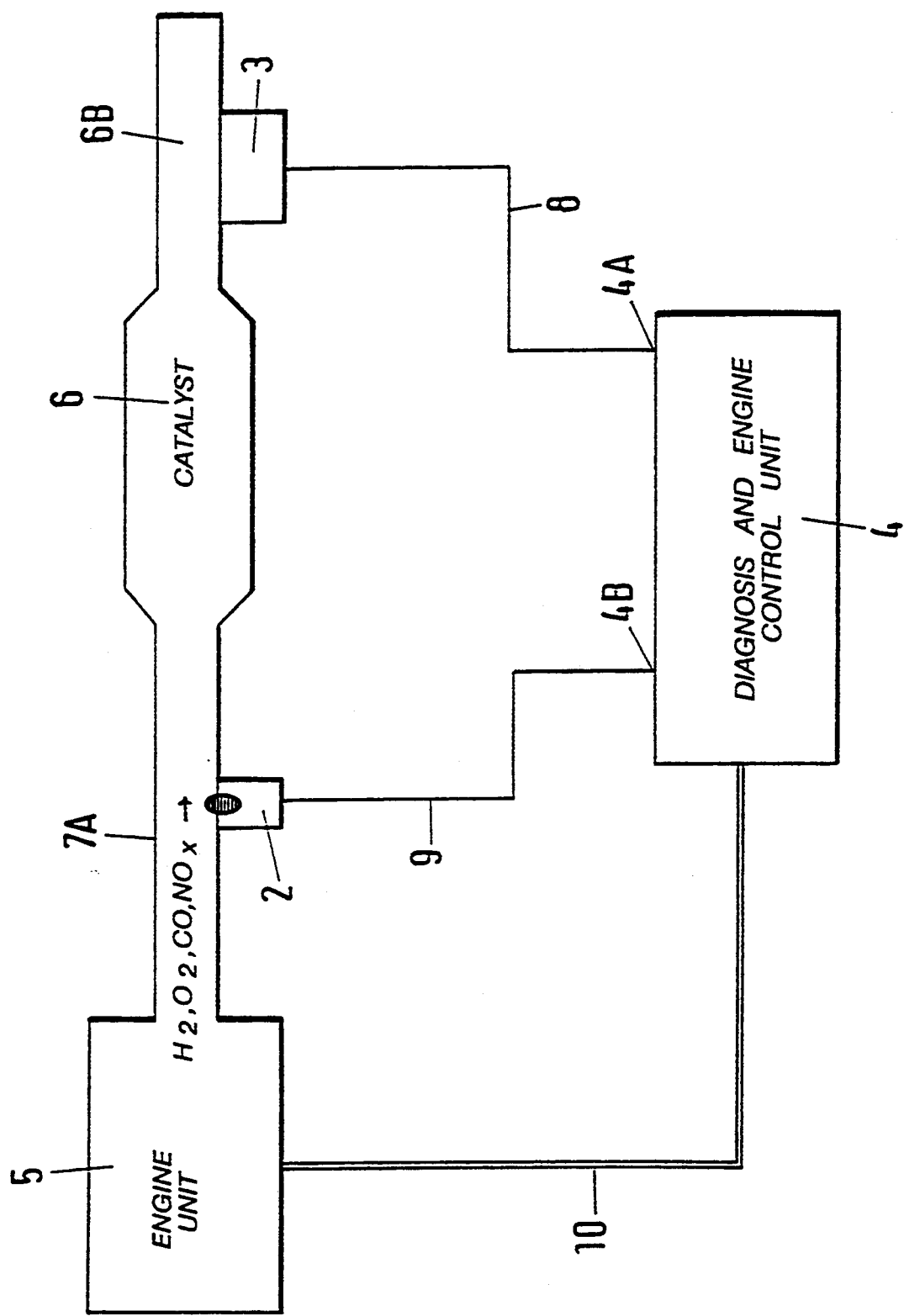

METHOD AND APPARATUS FOR REGULATING AND TESTING

The invention relates to a method for regulating an Otto engine and checking a catalyst connected downstream of the engine, as well as an apparatus for carrying out the method.

Such a method and apparatus are used wherever pollutants are removed from Otto engine exhaust gases by means of catalysts. In order to clean the exhaust gases of such engines as completely as possible, in the known apparatuses, the fuel-air ratio of Otto engines is regulated with a lambda sensor, and then the exhaust gas is carried past a three-way catalyst. As a result, still-combustible components such as carbon monoxide and hydrogen are oxidized, and nitrogen oxides are reduced. The functional capability of such a catalyst decreases as the time in service increases. It is therefore necessary to test the functional capability of the catalyst at defined time intervals. The standard method which was previously used includes detecting exhaust emissions during a predetermined driving cycle. Due to the requisite simulation of engine operating states and the necessary measuring technology, the standard method is very time-consuming and expensive. German Published, Non-Prosecuted Application DE-OS 34 43 649 discloses a further method for checking a catalyst. For that purpose, one respective lambda sensor is disposed each of upstream and downstream of the catalyst. The regulating frequencies of the voltage signals of the two sensors are compared with one another in the control of the fuel-air mixture. Since the effectiveness of a catalyst is determined by its capability of storing oxygen, among other factors, a conclusion as to the functional capability of the catalyst can be drawn from the ratio of the two regulating frequencies. A disadvantage of such an apparatus is that the quotient of the regulating frequency is different for every vehicle type and every catalyst system. The measurement variable is defined not only by the effectiveness of the catalyst but also by the properties of the lambda sensors and of the regulating electronics. Moreover, the known configurations are unable to act on the engine setting in such a way that increased emissions of carbon monoxide and/or hydrogen, or a major proportion of nitrogen oxide in the exhaust gas, can be reduced by suitable engine regulation. Therefore, a classification of a fully functional catalyst as nonfunctional because of poor engine regulation, for instance, cannot be precluded.

It is accordingly an object of the invention to provide a method and an apparatus for regulating an Otto engine and for checking a catalyst downstream of the engine, which overcome the hereinafore-mentioned disadvantages of the heretofore-known methods and devices of this general type.

With the foregoing and other objects in view there is provided, in accordance with the invention, a method for regulating an Otto engine and for checking a catalyst connected downstream of the engine, which comprises measuring at least a quantity of one component of an exhaust gas leaving an Otto engine before the exhaust gas enters a catalyst connected downstream of the engine, and measuring a quantity of at least two or more components of the exhaust gas after the exhaust gas leaves the catalyst.

In accordance with another mode of the invention, there is provided a method which comprises measuring a proportion of oxygen and a proportion of hydrogen and/or carbon monoxide in the exhaust gas leaving the catalyst.

In accordance with a further mode of the invention, there is provided a method which comprises measuring a content of hydrogen and/or carbon monoxide, a proportion of oxygen and a proportion of nitrogen oxide in the exhaust gas leaving the catalyst.

In accordance with an added mode of the invention, there is provided a method which comprises measuring a proportion of hydrogen and/or carbon monoxide and a proportion of nitrogen oxide in the exhaust gas leaving the catalyst.

In accordance with an additional mode of the invention, there is provided a method which comprises measuring a proportion of nitrogen oxide and a proportion of oxygen in the exhaust gas leaving the catalyst.

In accordance with yet another mode of the invention, there is provided a method which comprises ascertaining an actual proportion of oxygen in the exhaust gas leaving the engine.

In accordance with yet a further mode of the invention, there is provided a method which comprises evaluating measurement signals through an ascertained magnitude of the components of the exhaust gas, and indicating a nonfunctional status of the catalyst and/or regulating the engine unit if defined limit values are exceeded.

With the objects of the invention in view, there is also provided, in an assembly having an Otto engine unit, an exhaust line connected to the engine unit, and a catalyst being integrated into the exhaust line and having an inlet downstream of the engine unit and an outlet, an apparatus for regulating the engine unit and checking the catalyst, comprising a lambda sensor disposed in the exhaust line between the engine unit and the catalyst for issuing output signals; a first line connected to the lambda sensor; a diagnosis and engine control unit connected to the first line for receiving the output signals of the lambda sensor and issuing output signals; a sensor unit downstream of the output of the catalyst for issuing output signals; second lines for delivering the output signals of the sensor unit to the diagnosis and engine control unit; and third lines for delivering the output signals of the diagnosis and engine control unit to the engine unit.

In accordance with a concomitant feature of the invention, the sensor unit includes at least one ceramic solid electrolyte.

Other features which are considered as characteristic for the invention are set forth in the appended claims.

Although the invention is illustrated and described herein as embodied in a method and an apparatus for regulating and testing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

The drawing is a diagrammatic, elevational view and a block circuit diagram of an engine, an exhaust system and a regulating and testing apparatus, according to the invention.

Referring now to the single figure of the drawing in detail, there is seen an apparatus having a lambda sensor 2, a sensor unit 3 which may have at least one ceramic solid electrolyte, and a diagnosis and engine control unit 4. An engine unit 5 is also integrated into the apparatus. A catalyst 6 is built into an exhaust line 7A of the engine unit 5. The lambda sensor 2 is integrated into the exhaust line 7A between the engine unit 5 and the catalyst 6. The sensor unit 3 is built into the exhaust line 7A at an outlet 6B of the catalyst. The sensor unit 3 communicates through signal lines 8 with a first signal inlet 4A of the diagnosis and engine control unit 4. A second signal input 4B of this diagnosis and engine control unit 4 communicates with the lambda sensor 2 over a line 9. A regulated position of the engine setting is ascertained with the aid of the lambda sensor 2.

The sensor unit 3 is constructed in such a way that the proportion of carbon monoxide and/or hydrogen in the exhaust gas can be measured with the sensor unit. The proportion of nitrogen oxide can also be ascertained with the sensor unit. The residual oxygen in the exhaust gas after reaction with the oxidizable components such as carbon monoxide and hydrogen in the catalyst can also be ascertained with the sensor unit. Moreover, it is possible to measure the equilibrium oxygen concentration or the actual oxygen concentration without the aforementioned reaction. The sensor unit is constructed in such a way that the aforementioned exhaust gas components can be measured individually, or two or more components can be measured simultaneously, depending upon which regulation or checking is being performed at that moment by the diagnosis and engine control unit 4. In order to construct the sensor unit, it is advantageous if a plurality of exhaust gas components can be detected with one sensor component.

As was already noted at the outset above, the diagnosis and engine control unit 4 is provided for regulating the engine unit 5 and checking the catalyst 6. In order to provide regulation and control, output signals of the lambda sensor 2 and of the sensor unit 3 are supplied to this unit 4. The diagnosis and engine control unit 4 performs the evaluation of these signals and carries them on to the engine unit 5 over a line 10, if they are needed for regulating the engine unit 5. In order to check the catalyst 6, the proportions of hydrogen and/or carbon monoxide, above all, are compared with a predeterminable limit value. If that value is exceeded, then a signal is generated which indicates the nonfunctional status of the catalyst 6. Since the apparatus 1 according to the invention includes not only the lambda sensor 2 but also the sensor unit 3 with the aforementioned measurement capabilities, advantageous regulation of the engine unit 5 is possible with the diagnosis and engine control unit 4.

If the diagnosis and engine control unit 4 does not ascertain an impermissible increase of nitrogen oxide as well as carbon monoxide and/or hydrogen, which would indicate a defect in the catalyst 6, but instead only one of the components is relatively high, then a shift in the controlled position can be made toward richer or less rich controlled positions. In the first case, a lowering of the proportion of nitrogen oxide occurs, while in the second case, a lowering of the proportion of carbon monoxide is the result. Due to this operation, the aforementioned aging effects of the lambda sensor upstream of the catalyst or of the catalyst 6 itself can be reduced. Controlling special operating states, which is likewise carried out by utilizing the signals arriving from the lambda sensor 2 and the sensor unit 3 becomes possible, because the engine setting does not lead to impermissibly high pollutant emissions, both in the case of air enrichment and fuel enrichment.

If only one of the components, that is carbon monoxide and/or hydrogen or nitrogen oxide, is detected, then for an evaluation to be done, the oxygen content must be known. It has proved especially advantageous to know the residual oxygen remaining in the exhaust gas in the absence of a reaction with the oxidizable components of the exhaust gas after they leave the catalyst. The controlled position is determined with the aid of the oxygen content. Thus if there is an overly high concentration of carbon monoxide and/or hydrogen or nitrogen oxide, this can be ascertained to be due to a change in the regulating characteristic caused by aging, or to worsening of the conversion effect of the catalyst 6. In response, suitable readjustment of the engine control may be performed, or a defect may be reported. Measuring the equilibrium oxygen concentration by using the sensor unit 3 is especially suitable in checking special operating states, such as a lean enrichment upon cold starting of the engine of the engine unit 5.

I claim:

1. A method for regulating an Otto engine and for checking a catalyst connected downstream of the engine, which comprises measuring at least a quantity of one component of an exhaust gas leaving an Otto engine before the exhaust gas enters a catalyst connected downstream of the engine, and measuring a quantity of at least two components of the exhaust gas after the exhaust gas leaves the catalyst.

2. The method according to claim 1, which comprises measuring a quantity of oxygen and a quantity of at least one of hydrogen and carbon monoxide in the exhaust gas leaving the catalyst.

3. The method according to claim 1, which comprises measuring a content of at least one of hydrogen and carbon monoxide, a quantity of oxygen and a quantity of nitrogen oxide in the exhaust gas leaving the catalyst.

4. The method according to claim 1, which comprises measuring a quantity of at least one of hydrogen and carbon monoxide and a quantity of nitrogen oxide in the exhaust gas leaving the catalyst.

5. The method according to claim 1, which comprises measuring a quantity of nitrogen oxide and a quantity of oxygen in the exhaust gas leaving the catalyst.

6. The method according to claim 1, which comprises ascertaining an actual quantity of oxygen in the exhaust gas leaving the engine.

7. The according to claim 1, which comprises evaluating measurement signals through an ascertained magnitude of the components of the exhaust gas, and indicating a nonfunctional status of the catalyst if defined limit values are exceeded.

8. A method for regulating an Otto engine and for checking a catalyst connected downstream of the engine, which comprises measuring at least a quantity of one component of an exhaust gas leaving an Otto engine before the exhaust gas enters a catalyst connected downstream of the engine, measuring a quantity of at least two components of the exhaust gas after the exhaust gas leaves the catalyst, evaluating measurement signals through an ascertained magnitude of the components of the exhaust gas, and regulating the engine unit if defined limit values are exceeded.

9. A method for regulating an Otto engine and for checking a catalyst connected downstream of the engine, which comprises measuring at least a quantity of one component of an exhaust gas leaving an Otto engine before the exhaust gas enters a catalyst connected downstream of the engine, measuring a quantity of at least two components of the exhaust gas after the exhaust gas leaves the catalyst, evaluating measurement signals through an ascertained magnitude of the components of the exhaust gas, and indicating a nonfunctional status of the catalyst and regulating the engine unit if defined limit values are exceeded.

* * * * *